United States Patent
Vogels et al.

(10) Patent No.: US 7,501,107 B2
(45) Date of Patent: Mar. 10, 2009

(54) METHOD FOR OBTAINING PRECIPITATED CALCIUM CARBONATE PARTICLES OF NANOMETRIC SCALE STRUCTURE

(75) Inventors: Claude Vogels, Lasne (BE); Karine Cavalier, Alres (FR); Didier Sy, Salin de Giraud (FR); Roberto Rosa, Ranco (IT)

(73) Assignee: Solvay (Societe Anonyme), Brussels (BE)

( * ) Notice: Subject to any disclaimer, the term of this patent is extended or adjusted under 35 U.S.C. 154(b) by 164 days.

(21) Appl. No.: 10/481,887

(22) PCT Filed: Jul. 2, 2002

(86) PCT No.: PCT/EP02/07490

§ 371 (c)(1),
(2), (4) Date: May 3, 2004

(87) PCT Pub. No.: WO03/004414

PCT Pub. Date: Jan. 16, 2003

(65) Prior Publication Data

US 2004/0166047 A1  Aug. 26, 2004

(30) Foreign Application Priority Data

Jul. 4, 2001 (FR) .................... 01 08909

(51) Int. Cl.
*C01F 5/24* (2006.01)
(52) U.S. Cl. .................. 423/432; 423/165; 423/430
(58) Field of Classification Search .............. 423/430, 423/432, 165
See application file for complete search history.

(56) References Cited

U.S. PATENT DOCUMENTS

| | | | | |
|---|---|---|---|---|
| 4,157,379 A | * | 6/1979 | Arika et al. | 423/430 |
| 4,175,379 A | * | 11/1979 | Tega | 59/16 |
| 4,237,147 A | * | 12/1980 | Merten et al. | 426/590 |
| 4,367,207 A | * | 1/1983 | Vanderheiden | 423/432 |
| 5,007,964 A | * | 4/1991 | Tsukisaka et al. | 106/464 |
| 5,297,740 A | * | 3/1994 | Landscheidt et al. | 241/16 |
| 5,741,471 A | | 4/1998 | Deutsch et al. | |
| 5,750,086 A | | 5/1998 | You | |
| 5,833,747 A | * | 11/1998 | Bleakley et al. | 106/464 |
| 6,221,146 B1 | | 4/2001 | Jackson et al. | |

(Continued)

FOREIGN PATENT DOCUMENTS

EP   468 719   1/1992

(Continued)

OTHER PUBLICATIONS

U.S. Appl. No. 11/816,326, filed Aug. 15, 2007, Cavalier et al.

*Primary Examiner*—Steven Bos
*Assistant Examiner*—Paul Wartalowicz
(74) *Attorney, Agent, or Firm*—Oblon, Spivak, McClelland, Maier & Neustadt, P.C.

(57) ABSTRACT

Process for the production of precipitated calcium carbonate particles, structured at the nanoscale, by carbonation of milk of lime in the presence of a crystallization controller selected from the following list: polyaspartic acid, dioctyl sodium sulphosuccinate, polyacrylic acid, the molecular weight of which is between 500 and 15 000, and citric acid. When the crystallization controller is citric acid, its concentration in the milk of lime is between 5 and 15%.

14 Claims, 5 Drawing Sheets

U.S. PATENT DOCUMENTS

2004/0166047 A1    8/2004    Vogels et al.

FOREIGN PATENT DOCUMENTS

| EP | 844 213 | 5/1998 |
|---|---|---|
| JP | 59-97530 | 6/1984 |
| JP | 60-103025 | 6/1985 |
| WO | 99/51691 | 10/1999 |
| WO | 00/03949 | 1/2000 |

* cited by examiner

METHOD FOR OBTAINING PRECIPITATED CALCIUM CARBONATE PARTICLES OF NANOMETRIC SCALE STRUCTURE

The present invention relates to a process for the production of precipitated calcium carbonate particles structured at the nanoscale.

Particles of calcium carbonate precipitated by carbonation of milk of lime, by virtue of their high purity, are highly suitable as filler, in particular in paper and plastics. These applications also require very fine particles.

It is known (WO 99/51691) to produce precipitated calcitic calcium carbonate by carbonation of milk of lime in the presence of soluble organic compounds, such as citric acid, at very low concentration, of the order of 0.1%. However, the calcite particles obtained are too large to be actually used as filler in plastics.

U.S. Pat. No. 4,157,379 discloses fibrous particles, structured at the nanoscale, of precipitated calcium carbonate which are composed of the agglomeration, as a chain, of primary corpuscles having a mean diameter of between 10 and 100 nm.

However, these particles require a complex two-stage carbonation of the milk of lime; in the first stage, a chelating agent is added to the milk of lime to form a colloidal suspension; the latter is subsequently carbonated in the presence of another additive, a soluble metal salt, everything being under controlled pH.

The present invention is targeted at obtaining in a simple way, in a single stage, precipitated calcium carbonate particles having a nanostructure. The present invention is also targeted at producing such particles additionally having specific morphologies.

Consequently, the invention relates to a process for the production of precipitated calcium carbonate particles, structured at the nanoscale, by carbonation of milk of lime, which is characterized in that the carbonation is carried out in the presence of a crystallization controller selected from the following list: citric acid in a concentration of between 5 and 15%, polyacrylic acid with a molecular weight of between 500 and 15 000, dioctyl sodium sulphosuccinate and polyaspartic acid.

The term "particle" is understood to mean a physically and chemically autonomous entity. According to the invention, the particles are structured at the nanoscale. This means that they are composed of one or more separate components, apparent at the nanoscale, having a characteristic dimension at this nanoscale. In particular, this characteristic dimension is, on average, less than 100 nm. In a particularly preferred way, it is on average between 1 and 50 nm. When the particle structured at the nanoscale comprises several components, the latter are combined to form an integral whole. These constituent components can, for example, be nanoplates or nanofibres. In the case of nanoplates, the characteristic dimension is their thickness; in the case of nanofibres, the characteristic dimension is their diameter.

In the process which is a subject-matter of the invention, milk of lime is carbonated. To this end, the concentration of calcium hydroxide in the milk of lime can have a value of 3 to 200 g/l. Advantageously, this concentration has a value of at least 25 g/l. It is recommended that it does not exceed 75 g/l. During its carbonation, the milk of lime can have temperatures varying from 0 to 80° C. It is preferable for the temperature not to be less than 5° C. Moreover, it is preferable for it not to exceed 30° C. The milk of lime is carbonated by reaction of the latter with carbon dioxide gas. Carbon dioxide gas having a concentration of carbon dioxide varying from 3 to 100% could be used with success. However, it is preferable to use carbon dioxide gas for which the concentration is between 10 and 60%. The concentration is advantageously at least 25%. It is more particularly preferable for it not to exceed 30%.

According to the invention, the calcium carbonate particles, which are preferably in the form of calcite, are obtained by carbonation of milk of lime in the presence of a crystallization controller. The expression "crystallization controller" is understood within the broad functional meaning. This is because the function of the crystallization controller is to modify the interaction between the solid, liquid and gas phases present, during the nucleation and/or the growth of the crystalline seeds of calcium carbonate, so as to control the crystalline morphology obtained.

A significant number of substances are supposed to have such properties, at various levels of intensity. However, it has been observed that some of them, a very limited number, when they are introduced into the milk of lime, bring about in a simple and reproducible way the appearance of calcium carbonate structured at the nanoscale. Without wishing to be committed to a theoretical explanation, the inventor believes that these specific additives have a twofold action: a chemical action and a structuring action. The chemical action takes place before the carbonation reaction and the structuring action during the carbonation reaction. This is because the additives can equally well modify the prereaction medium (modification of the pH, of the concentration of $Ca^{2+}$ ions in the medium, of the super-saturation, and the like) as play their role during the reaction. Some organic crystallization controllers, by virtue of their macromolecular structure, can modify the nucleation and/or slow down the growth of certain crystalline faces of the calcium carbonate.

Furthermore, some organic crystallization controller additives also promote the combining of nanometric crystalline seeds to form organized structures. Finally, these additives can modify the structure of the suspended $Ca(OH)_2$ crystals, which then act as promoters to the particles structured at the nanoscale which are a subject-matter of the invention.

It has been observed that, generally, to obtain calcium carbonate particles structured at the nanoscale according to the invention, the milk of lime is advantageously carbonated in the presence of substantial amounts of crystallization controller. It has emerged that the optimum concentrations of crystallization controller depend on the concentration of the milk of lime. Generally, concentrations of additive of greater than 1% are recommended. The percentages are measured with respect to the weight of calcium carbonate produced. They can be easily converted with respect to the weight of calcium hydroxide initially in solution by using the rules of stoichiometry. Concentrations of at least 2% are preferred. There is no additional advantage in the concentration exceeding 20%.

The product obtained on conclusion of the carbonation of the milk of lime has to be dried. The drying can be carried out, for example, in an oven, by spraying into a stream of hot air (spray drying) or by the action of radiation, for example infrared radiation (epiradiator).

In some cases, it may be advantageous for the particles structured at the nanoscale to be coated with a layer of organic matter. This can be the case when these particles are used as filler, in particular in plastics. The coating organic matter layer can be composed, for example, of saturated or unsaturated fatty acids, it being possible for the length of the carbonaceous chain to vary from 2 to 22 carbon atoms, fatty acids with chains comprising from 16 to 18 carbon atoms being preferred. The coating layer can also be composed of alkyl sulphosuccinates, in particular of dioctyl sodium sulphosuccinate. Finally, and still by way of example, advantageous results have also been obtained when the coating layer is aminocaproic acid.

According to the invention, the crystallization controller is selected from: citric acid, polyacrylic acid, dioctyl sodium sulphosuccinate and polyaspartic acid.

In a first alternative form of implementation of the invention, the crystallization controller is citric acid. The citric acid can, according to the circumstances, be partially esterified or can exist in the citrate or phosphocitrate form. Nevertheless, citric acid is preferred. It can be introduced before or during the precipitation stage. It has been observed that the calcium carbonate particles structured at the nanoscale are obtained when citric acid is introduced at a concentration of between 5 and 15%, the percentages being calculated with respect to the weight of calcium carbonate obtained. Preferably, this concentration is greater than 7%. It is particularly preferable for it to remain below 12%.

It has also been observed that, in this first alternative form of implementation of the invention, low carbonation temperatures are preferable. In a preferred embodiment of this alternative form, the temperatures at the beginning of carbonation do not exceed 10° C. However, it is preferable not to fall below 4° C. Temperatures between 5 and 8° C. are particularly preferred. It should be noted that, depending on the devices used, the temperatures at the end of carbonation can differ to a greater or lesser extent from the temperatures at the beginning of carbonation.

It has also emerged that the particles structured at the nanoscale according to this first alternative form of the invention can have a very high specific surface. In a preferred embodiment of this alternative form, the particles structured at the nanoscale have a specific surface of greater than 70 $m^2/g$. The specific surfaces are measured by the BET technique described in Standard ISO 9277. In this embodiment, it is recommended that the drying be carried out by radiation, for example infrared radiation.

In a second alternative form of implementation of the invention, the crystallization controller is polyacrylic acid. The polyacrylic acid can also be provided in the salt form, for example sodium salt form. In accordance with the invention, it has emerged that the molecular weight of the poly(sodium acrylate) is critical and is between 500 and 15 000. Preferably, this molecular weight is between 700 and 4 000. It is particularly preferable for it to be less than 2 000. Values of greater than 1 000 have also emerged as the most preferable.

In this alternative form of implementation according to which the crystallization controller is polyacrylic acid, it is advantageous for the temperature at the beginning of carbonation to be greater than 10° C. It is preferably greater than 14° C. However, it is recommended not to exceed 25° C. Values of between 15 and 20° C. are the most advantageous. Furthermore, it is preferable for the concentration of poly(sodium acrylate) in the milk of lime to be greater than 1%. It is desirable for the concentration to remain below 10%. Concentration values varying from 2 to 5% are more preferred.

In a third alternative form of implementation of the invention, the crystallization controller is dioctyl sodium sulphosuccinate. The concentration of dioctyl sulphosuccinate in the milk of lime is advantageously greater than 5%. Concentrations of greater than 15% are to be avoided, however, values of between 8 and 12% being preferred. When the crystallization controller is dioctyl sodium sulphosuccinate, it is also advantageous for the temperature at the beginning of carbonation to be greater than 10° C. It is preferably greater than 14° C. Care will also be taken not to exceed 25° C., values of between 15 and 20° C. being the most advantageous.

According to this third alternative form of implementation, it has emerged as advantageous to reduce the flow rate of gas during the carbonation.

In addition, this third alternative form exhibits the advantage that the coating of the nanoparticles is generally unnecessary, since dioctyl sodium sulphosuccinate has been introduced during the carbonation.

In a final alternative form of implementation of the invention, which is advantageous, the crystallization controller is polyaspartic acid. The polyaspartic acid is advantageously provided in the salt form, in particular the sodium salt form of polyaspartic acid. According to this alternative form, which is preferred, concentrations of polyaspartic acid in milk of lime of greater than 1% may be sufficient. It is desirable for this concentration not to exceed 5%. Advantageously, it has a value of at least 2%. It is preferable for it not to exceed 4%. The temperature at the beginning of carbonation is advantageously greater than 10° C. It is preferably greater than 14° C. Values of greater than 20° C. are to be avoided, however.

The invention also relates to the calcium carbonate particles obtained by the process according to the invention.

In an advantageous embodiment of the invention, the precipitated calcium carbonate particles structured at the nanoscale obtained by the process according to the invention are composed of at least one nanofibre.

A nanofibre is an elongated entity, the diameter of which is, at the nanoscale, preferably less than 50 nm. Nevertheless, it will advantageously remain greater than 1 nm. The length of the nanofibre is such that the length/diameter ratio exceeds 5. Length/diameter ratios of greater than 100 are rare. It is preferable for them to remain below 20. In some cases, the nanofibres are straight. However, those having a high length/diameter ratio are frequently curved.

Without wishing to be committed to a theoretical explanation, the inventor believes that the nanofibres result from the end-to-end juxtaposition of similar small grains, approximately spherical, having a diameter close to that of the nanofibre.

Under some experimental conditions, the small grains lose their individuality to form a nanofibre which appears homogeneous and even, for example on electron microscopy photographs, whatever the magnification. Under other experimental conditions, the small grains retain their individuality and remain visible, for example on electron microscopy photographs. The nanofibre then has the appearance of a "nanorosary".

In an alternative form of this embodiment of the invention, the nanofibre structure is of the nanorosary type.

Nanorosaries having a diameter of between 10 and 30 nm and a length of between 350 and 750 nm are advantageous.

The particles according to the invention may be composed only of one nanofibre, which is then itself autonomous.

In the case where the particles are composed of several nanofibres in combination, the latter can be combined in any way. Generally, and in particular when they have a very high length/diameter ratio, they are interwoven with respect to one another in a disorganized way.

However, it has been observed that nanofibres, whether or not they are of the nanorosary type, can also be combined parallel to one another, in a surprising organized fashion. The structure formed then resembles a "faggot" of nanofibres, as described below.

In another advantageous embodiment of the invention, the precipitated calcium carbonate particles structured at the nanoscale obtained by the process according to the invention are composed of at least one nanoplate.

The nanoplates have a thickness at the nanoscale advantageously of greater than 20 nm. Thicknesses of between 20 and 50 nm are preferred. The nanoplates have a diameter/thickness ratio of greater than or equal to 5. This ratio rarely exceeds 100. Preferably, this ratio is less than 10.

The particles according to the invention may be composed only of one nanoplate, which is then itself autonomous.

In the case where the particles are composed of several nanoplates in combination, it has been observed that these nanoplates can be combined in a novel and advantageous way, being superimposed to form "accordions of nanoplates".

The invention consequently also relates to precipitated calcium carbonate particles structured at the nanoscale which are characterized in that they are composed of nanoplates combined as accordions.

The length of the accordions is advantageously greater than 200 nm. It is preferable for it to remain below 1 500 nm.

It is possible, to obtain precipitated calcium carbonate particles structured at the nanoscale and composed of nanoplates arranged as accordions, to proceed in particular according to the abovementioned process. In this case, it is advantageous to proceed by carbonation of milk of lime in the presence of dioctyl sodium sulphosuccinate, which acts as crystallization controller.

The invention also relates to precipitated calcium carbonate particles structured at the nanoscale which are characterized in that they are composed of nanofibres combined as faggots.

The faggots are generally composed of several tens of similar nanofibres. This number is preferably greater than 100. Faggots comprising more than 10 000 nanofibres are exceptional.

The diameter of the faggots, which obviously depends on the number of nanofibres which they comprise, is preferably greater than 50 nm. Faggots having a diameter of between 100 and 500 nm are advantageous. nanofibres constituting them but also on the way in which they are combined: in some cases, the length of the faggot can be similar to that of the nanofibres. Generally, nevertheless, some nanofibres just out over the others and the length of the faggot is greater than that of the fibres. Faggots with a length of between 500 and 1 500 nm are preferred.

It is possible, to obtain precipitated calcium carbonate particles structured at the nanoscale and composed of nanofibres arranged as faggots, to proceed in particular according to the abovementioned process. In this case, it is advantageous to proceed by carbonation of milk of lime in the presence of a crystallization controller selected from polyaspartic acid, citric acid or polyacrylic acid.

Polyacrylic acid is preferred.

When the crystallization controller is polyacrylic acid, it is recommended to increase the concentration of polyacrylic acid when the concentration of calcium hydroxide in the milk of lime is higher. It has also been observed that the use of polyacrylic acid brings about the appearance of faggots having a larger diameter than those obtained with other additives.

The particles structured at the nanoscale according to the invention are advantageously used as filler, for example in paper or plastic.

In a preferred alternative form, the precipitated calcium carbonate particles structured at the nanoscale in accordance with the invention are used as filler in plastic.

In this use, the particles structured at the nanoscale improve the mechanical properties of the plastic. This is because their nanostructure confers on them excellent coupling with the polymer matrix. They can also improve the barrier properties of the plastic to various fluids, liquids or gases, by virtue of their very high specific surface, which exerts a screening effect on the fluid which it is desired to contain.

FIGS. 1 and 2 are electron microscopy photographs which illustrate, by way of example, "nanofibre" structures. Their magnifications are 100 000 and 70 000 respectively.

FIG. 3 is an electron microscopy photograph which illustrates an example of a "nanorosary" structure. Its magnification is 70 000.

FIGS. 4 and 5 are electron microscopy photographs which illustrate, by way of example, the same "faggot" structure at different magnifications. Their magnifications are 40 000 and 100 000 respectively.

The description which follows of examples presented in support of the invention illustrates the variety of nanostructures which can be obtained by strict control of the carbonation conditions.

EXAMPLE 1

(In Accordance With the Invention)

Figure 1:
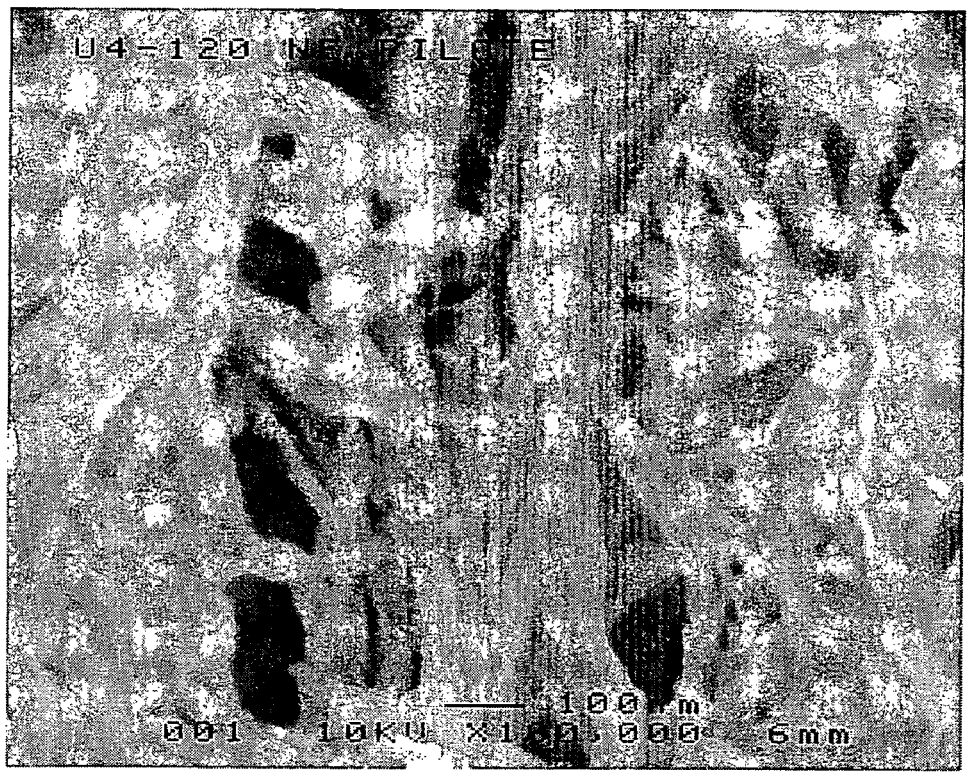

Milk of lime, the concentration of which, expressed in g/l of $CaCO_3$, is 31 and the initial temperature of which has a value of 7.4° C., was carbonated by $CO_2$, the concentration of which has a value of 28% and the flow rate of which has a value of 16 $m^3$/h, in the presence of 8% (percentage relative to the $CaCO_3$ produced) of citric acid. The temperature at the end of carbonation rose to 11.1° C. The precipitated calcium carbonate was subsequently dried in an oven at 75° C. The product obtained, represented in FIG. 1, proved to be structured, at the nanoscale and was composed of nanofibres having a diameter varying on average between 10 and 40 nm. The BET specific surface of the product was measured at 22 $m^2$/g.

EXAMPLE 2

(In Accordance With the Invention)

Figure 2:
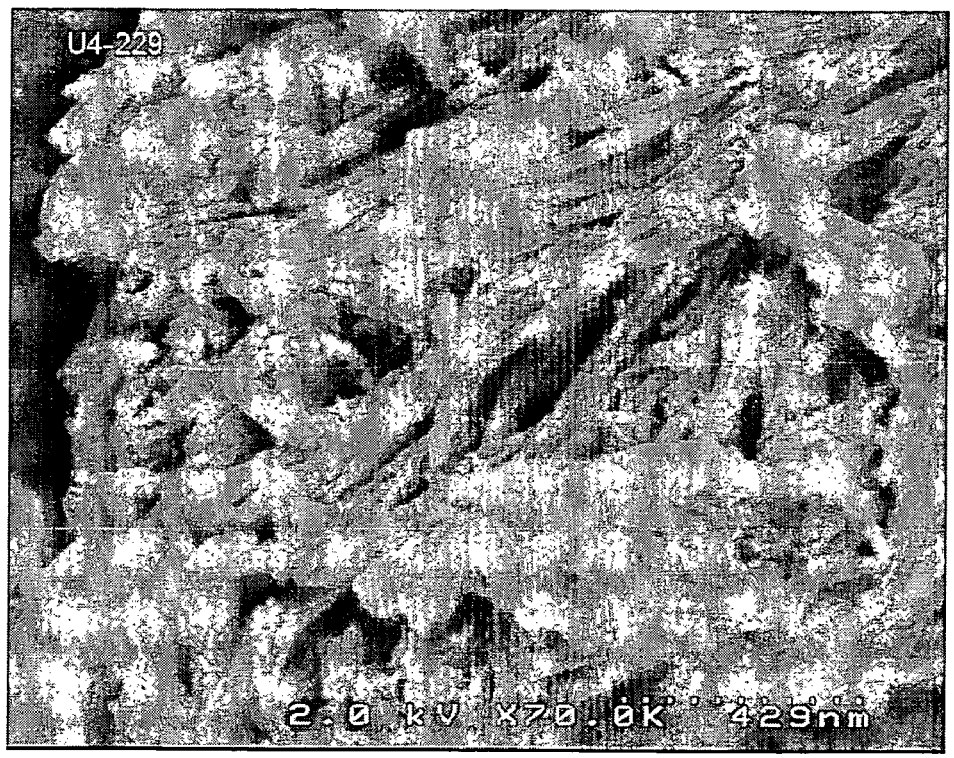

The preparation was carried out as in Example 1, except that the precipitated calcium carbonate was dried by the "epiradiator" technique at 70° C. The specific surface of the product proved to reach 98 $m^2$/g. The product is illustrated in the electron microscopy photograph in FIG. 2.

EXAMPLE 3

(Not in Accordance With the Invention)

Figure 7:
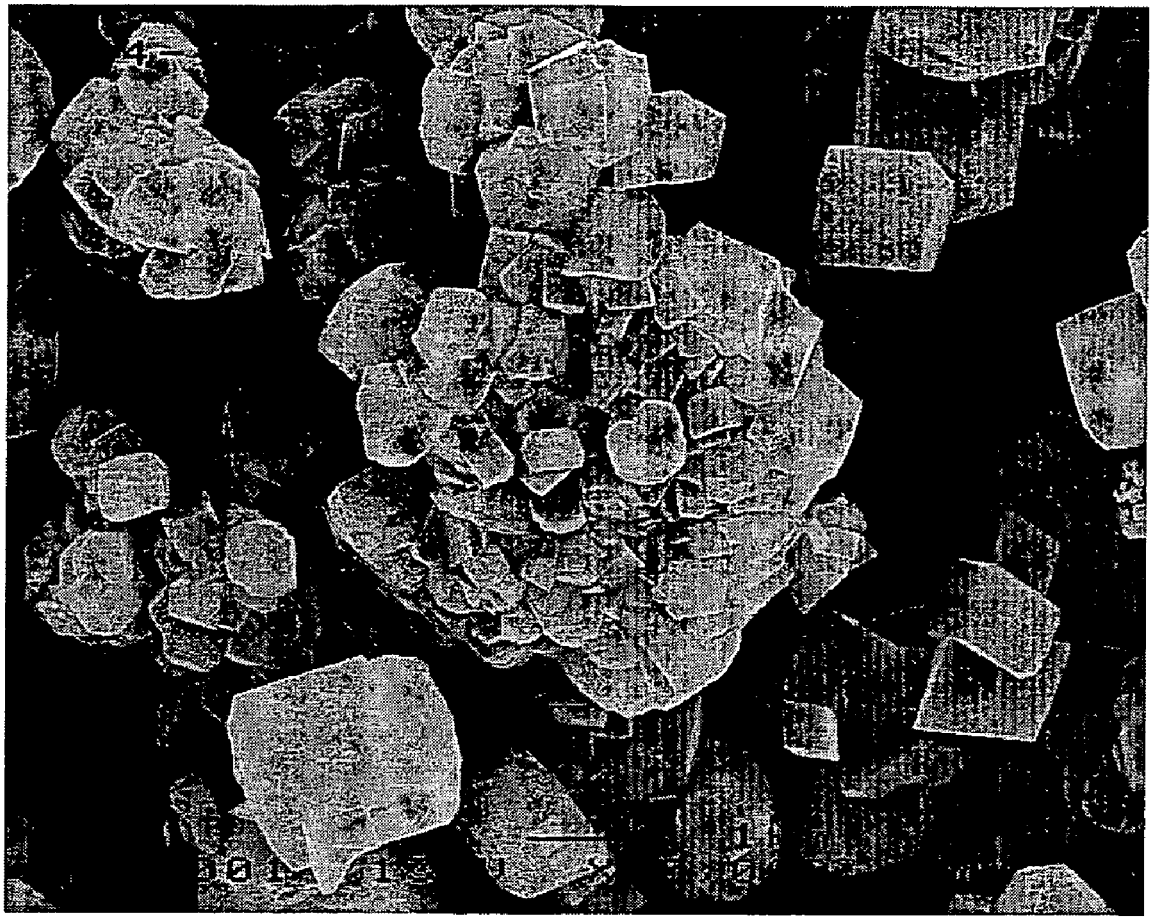
FIG. 7 is an electron microscopy photograph which illustrates precipitated calcium carbonate particles not in accordance with the invention which do not have a structure at the nanoscale. Its magnification is 10 000.

The preparation was carried out as in Example 1, except that the temperature of the beginning of carbonation was 3.8° C. and the concentration of the milk of lime had a value of 26 g/l. The precipitated calcium carbonate obtained, illustrated in the photograph in FIG. 7, was not structured at the nanoscale.

EXAMPLE 4

(In Accordance With the Invention)

Figure 3:
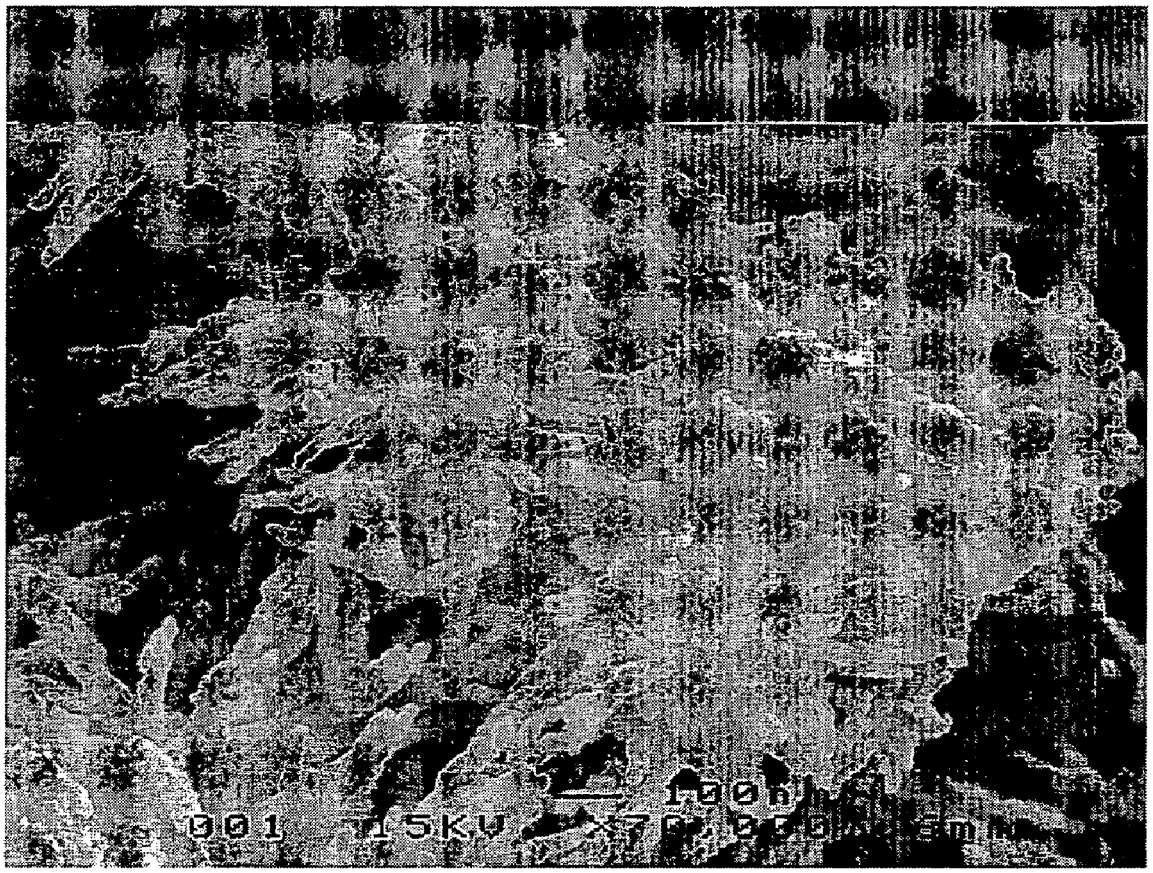

Milk of lime, the concentration of which, expressed in g/l of $CaCO_3$, is 35 and the initial temperature of which has a value of 16.1° C., was carbonated by $CO_2$, the concentration of which has a value of 28% and the flow rate of which has a value of 16 m³/h, in the presence of 2% (percentage relative to the $CaCO_3$ produced) of poly(sodium acrylate). The temperature at the end of carbonation rose to 16.9° C. The precipitated calcium carbonate was subsequently dried in an oven at 75° C. The product obtained, which was coated with dioctyl sodium sulphosuccinate, is represented in FIG. 3. It proved to be structured at the nanoscale and was composed of nanorosaries having a diameter varying on average between 20 and 50 nm. The BET specific surface of the product was measured at 50 m²/g.

EXAMPLE 5

(In Accordance With the Invention)

Figure 4:
Figure 5:
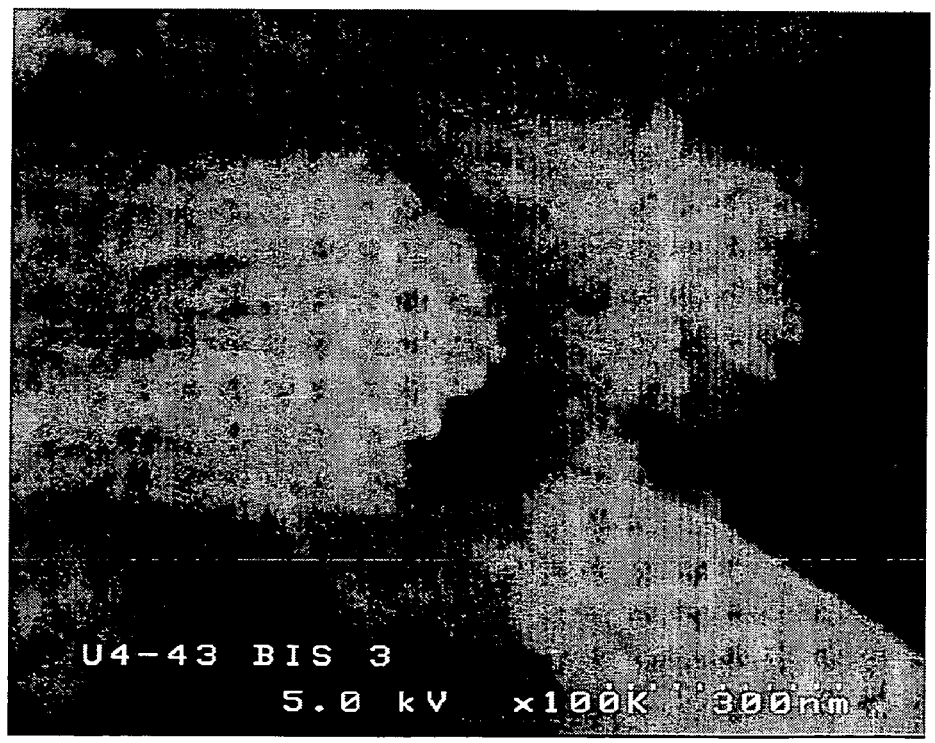

Milk of lime, the concentration of which, expressed in g/l of $CaCO_3$, is 25 and the initial temperature of which has a value of 15.8° C., was carbonated by $CO_2$, the concentration of which has a value of 28% and the flow rate of which has a value of 16 m³/h, in the presence of 2% (percentage relative to the $CaCO_3$ produced) of poly(sodium acrylate). The temperature at the end of carbonation rose to 18.2° C. The precipitated calcium carbonate was subsequently dried in an oven at 75° C. The product obtained, represented in FIGS. 4 and 5, proved to be structured at the nanoscale and was composed of nanofibres combined as faggots. The specific surface was measured at 37 m²/g.

EXAMPLE 6

(In Accordance With the Invention)

Figure 6:
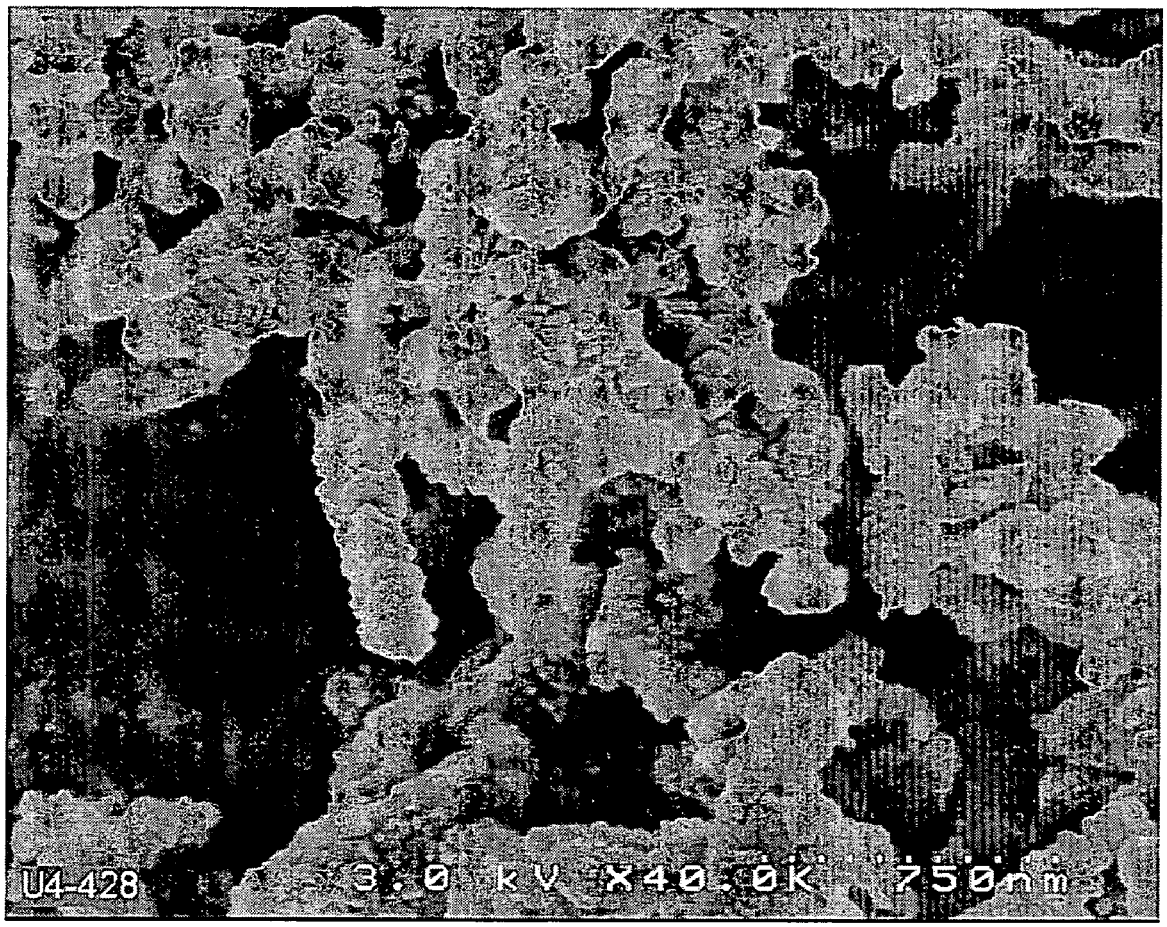
FIG. 6 is an electron microscopy photograph which illustrates an example of an "accordion of nanoplates" structure. Its magnification is 40 000.

Milk of lime, the concentration of which, expressed in g/l of $CaCO_3$, is 25 and the initial temperature of which has a value of 15.9° C., was carbonated by $CO_2$, the concentration of which has a value of 28%. The $CO_2$ flow rate was adjusted to 25 m³/h for 5 minutes and was then reduced to 5 m³/h. The carbonation was carried out in the presence of 10% (percentage relative to the $CaCO_3$ produced) of dioctyl sodium sulphosuccinate. The temperature at the end of carbonation rose to 17.7° C. The precipitated calcium carbonate was subsequently dried in an oven at 75° C. The product obtained, represented in FIG. 6, proved to be structured at the nanoscale and was composed of nanoplates combined as accordions. The thickness of the nanoplates is between 10 and 40 nm. The BET specific surface of the product was measured at 9 m²/g.

The invention claimed is:

1. A process for preparing precipitated calcium carbonate particles structured at the nanoscale, comprising, in a single stage:
    carbonating milk of lime in the presence of dioctyl sodium sulphosuccinate in a concentration of greater than 1% and not exceeding 20% to obtain calcium carbonate particles comprising at least one of nanofibres, nanofibres of nanorosary type, nanoplates, nanoplates combined as accordions, and nanofibres combined as faggots; or
    carbonating milk of lime in the presence of polyaspartic acid and/or a salt thereof in a concentration of greater than 1% and not exceeding 20% to obtain calcium carbonate particles comprising at least one of nanofibres, nanofibres of nanorosary type, nanoplates, nanoplates combined as accordions, and nanofibres combined as faggots.

2. A process for the production of precipitated calcium carbonate particles structured at the nanoscale, comprising carbonation of milk of lime,
    wherein the carbonation is carried out in the presence of at least one crystallization controller, and
    wherein the crystallization controller is dioctyl sodium sulphosuccinate.

3. The process according to claim 1, comprising carbonating milk of lime in the presence of polyaspartic acid and/or a salt thereof.

4. Precipitated calcium carbonate particles obtained by the process according to claim 1, which are composed of at least one nanofibre.

5. The precipitated calcium carbonate particles according to claim 1, wherein the nanofibre is of the nanorosary type.

6. A process for the production of precipitated calcium carbonate particles structured at the nanoscale, comprising carbonation of milk of lime,
    wherein the carbonation is carried out in the presence of at least one crystallization controller selected from the group consisting of citric acid and/or a salt thereof in a concentration of between 5 and 15%, polyacrylic acid and/or a salt thereof with a molecular weight of between 500 and 15 000, dioctyl sodium sulphosuccinate and polyaspartic acid and/or a salt thereof,
    and wherein the precipitated calcium carbonate particles are composed of at least one nanoplate.

7. Precipitated calcium carbonate particles structured at the nanoscale, which are composed of nanoplates combined as accordions.

8. Precipitated calcium carbonate particles structured at the nanoscale, which are composed of nanofibres combined as faggots.

9. Plastic comprising the precipitated calcium carbonate particles according to claim 7.

10. A process comprising
    mixing precipitated calcium carbonate particles obtained by the process according to claim 1 with one or more plastics.

11. A plastic composition comprising one or more plastics and precipitated calcium carbonate particles obtained by the process according to claim 1.

12. Plastic comprising the precipitated calcium carbonate particles according to claim 8.

13. The process as claimed in claim 1, wherein:
    carbonating milk of lime in the presence of dioctyl sodium sulphosuccinate comprises carbonating milk of lime to obtain precipitated calcium carbonate particles comprising nanoplates combined as accordions; and
    carbonating milk of lime in the presence of polyaspartic acid and/or a salt thereof comprises carbonating milk of lime to obtain precipitated calcium carbonate particles comprising nanofibres combined as faggots.

14. The process as claimed in claim 1, wherein the carbonation is carried out in the presence of dioctyl sodium sulphosuccinate.

* * * * *

UNITED STATES PATENT AND TRADEMARK OFFICE
CERTIFICATE OF CORRECTION

PATENT NO. : 7,501,107 B2 Page 1 of 1
APPLICATION NO. : 10/481887
DATED : March 10, 2009
INVENTOR(S) : Vogels et al.

It is certified that error appears in the above-identified patent and that said Letters Patent is hereby corrected as shown below:

On the title page, Item (86), the PCT information is incorrect. Item (86) should read:
-- (86) PCT No.:   PCT/EP02/07490

§ 371 (c) (1),
(2), (4) Date: Jan. 2, 2004 --

Signed and Sealed this

Eleventh Day of August, 2009

David J. Kappos
*Director of the United States Patent and Trademark Office*